(12) United States Patent
Wen et al.

(10) Patent No.: US 10,313,895 B2
(45) Date of Patent: Jun. 4, 2019

(54) WIRELESS COMMUNICATIONS METHOD AND SYSTEM

(71) Applicant: Huawei Technologies Co., Ltd., Shenzhen (CN)

(72) Inventors: Rong Wen, Chengdu (CN); Jia He, Chengdu (CN); Huang Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 15/469,028

(22) Filed: Mar. 24, 2017

(65) Prior Publication Data

US 2017/0195894 A1 Jul. 6, 2017

Related U.S. Application Data

(63) Continuation of application No. PCT/CN2014/088819, filed on Oct. 17, 2014.

(51) Int. Cl.
*H04W 16/28* (2009.01)
*H04W 72/04* (2009.01)
(Continued)

(52) U.S. Cl.
CPC ......... *H04W 16/28* (2013.01); *H04B 7/0408* (2013.01); *H04B 7/0413* (2013.01);
(Continued)

(58) Field of Classification Search
None
See application file for complete search history.

(56) References Cited

U.S. PATENT DOCUMENTS

| | | | |
|---|---|---|---|
| 2006/0111149 A1* | 5/2006 | Chitrapu | H01Q 1/246 455/562.1 |
| 2006/0286974 A1* | 12/2006 | Gore | H04W 16/00 455/422.1 |

(Continued)

FOREIGN PATENT DOCUMENTS

| | | |
|---|---|---|
| CN | 101127550 A | 2/2008 |
| CN | 101166047 A | 4/2008 |

(Continued)

*Primary Examiner* — Lonnie V Sweet
(74) *Attorney, Agent, or Firm* — Slater Matsil, LLP

(57) ABSTRACT

A wireless communications method and a wireless communications system are disclosed. In an embodiment, the system includes a transmit end including a transmit module having at least two antenna units, the transmit module is configured to transmit M narrow beams with different spatial directions according to a quality of service requirement, and switches a transmit mode according to a preset switching rule, wherein a set of the spatial directions of the M narrow beams forms a transmit mode; a receive end including a receive module having at least two antenna units, the receive module is configured to receive N beams according to the QoS requirement, and a transmission channel is formed, wherein the receive end calculates transmission channel quality in different transmit modes, searches for a transmit mode that meets the QoS requirement, and feeds back the transmit mode to the transmit end.

18 Claims, 8 Drawing Sheets

(51) Int. Cl.
  *H04W 72/08* (2009.01)
  *H04B 7/0408* (2017.01)
  *H04B 7/0413* (2017.01)
  *H04B 7/06* (2006.01)
  *H04B 7/08* (2006.01)

(52) U.S. Cl.
  CPC ........... *H04B 7/063* (2013.01); *H04B 7/0695* (2013.01); *H04B 7/088* (2013.01); *H04W 72/0493* (2013.01); *H04W 72/085* (2013.01)

(56) References Cited

U.S. PATENT DOCUMENTS

| | | | |
|---|---|---|---|
| 2008/0049709 A1 | 2/2008 | Pan et al. | |
| 2013/0223487 A1 | 8/2013 | Zhou | |
| 2013/0301454 A1* | 11/2013 | Seol | H04B 7/043 370/252 |
| 2015/0003325 A1* | 1/2015 | Sajadieh | H04W 76/10 370/328 |
| 2015/0381319 A1 | 12/2015 | Kwak et al. | |
| 2016/0365900 A1* | 12/2016 | Kim | H04B 7/0408 |
| 2017/0272132 A1* | 9/2017 | Tsai | H04B 7/0695 |

FOREIGN PATENT DOCUMENTS

| | | |
|---|---|---|
| CN | 102318220 A | 1/2012 |
| JP | 2006115491 A | 4/2006 |
| JP | 2008520167 A | 6/2008 |
| JP | 2008547283 A | 12/2008 |
| JP | 2010501136 A | 1/2010 |
| JP | 2013179423 A | 9/2013 |
| WO | 2010078193 A2 | 7/2010 |
| WO | 2014081257 A1 | 5/2014 |

* cited by examiner

WIRELESS COMMUNICATIONS METHOD AND SYSTEM

CROSS-REFERENCE TO RELATED APPLICATIONS

This Application is a continuation of International Application No. PCT/CN2014/088819, filed on Oct. 17, 2014, the disclosure of which is hereby incorporated by reference in its entirety.

TECHNICAL FIELD

The present invention relates to the wireless communications field, and in particular, to a wireless communications method and system.

BACKGROUND

An existing base station (BS) communicates with user equipment (UE) in a broadcasting manner in which a beam is extremely wide, coverage is wide, user equipment in a same sector of beams can be distinguished only by frequencies, each user equipment occupies small bandwidth in a given frequency bandwidth, and a system capacity is small because time-division multiplexing is used. By contrast, a millimeter wave has a higher frequency band and a narrower beam. A high-gain directional narrow beam may be implemented by using a beamforming technology, so that each user equipment can perform space division multiplexing/frequency division multiplexing by using multiple narrow beams to obtain a multiplexing gain and improve a communication capacity.

In beamforming technology, an antenna distance needs to be not greater than ½ of a wavelength. However, in a line of sight (LOS) situation, non-correlation of multiple-input multiple-output (MIMO) channels requires an antenna distance to be greater than a specific value, and a greater antenna distance indicates a lower antenna correlation. Therefore, for a large-scale array antenna system with a high frequency band, because an antenna diameter is limited and an antenna distance is relatively small, it is difficult to meet a Rayleigh length of LOS-MIMO so as to ensure non-correlation between MIMO channels. In a conventional technology, communication quality of a MIMO communications system is relatively poor.

SUMMARY

In view of this, the present invention provides a wireless communications method and system. Transmit/receive antennas are separated to respectively split transmit/receive antenna units into M/N subarrays and form M/N beams with low correlation that are separate in space. Therefore, a transmission-dimensional structure similar to MIMO is formed, transmit modes of the transmit/receive antennas are obtained by means of searching, and relatively high communication quality is ensured.

According to a first aspect, a wireless communications system is provided, including a transmit end, where the transmit end includes a transmit module having at least two antenna units, the transmit module transmits M narrow beams with different spatial directions according to a quality of service (QoS) requirement, and switches a transmit mode according to a preset switching rule, and a set of the spatial directions of the M narrow beams forms a transmit mode and a receive end, where the receive end includes a receive module having at least two antenna units, the receive module receives N beams according to the QoS, and a transmission channel is formed between the transmit end of the M narrow beams and the receive end of the N beams; the receive end calculates transmission channel quality in different transmit modes, searches for a transmit mode that meets the QoS requirement, and feeds back the transmit mode to the transmit end, or feeds back a transmit mode with optimal channel quality to the transmit end if transmission channel quality corresponding to all transmit modes is traversed but no transmit mode that meets the QoS requirement is found; and both M and N are integers greater than or equal to 1.

According to a second aspect, a wireless communications method is provided, including enabling, according to a quality of service requirement, a transmit module of a transmit end to transmit M narrow beams with different spatial directions and a receive module of a receive end to receive N beams, so as to form a transmission channel, where both M and N are integers greater than or equal to 1, switching a transmit mode according to a preset switching rule, where a set of the spatial directions of the M narrow beams forms a transmit mode, obtaining channel quality in a current transmit mode according to signals received by the N beams of the receive end and searching for a transmit mode that meets the QoS requirement and feeding back the transmit mode to the transmit end, or feeding back a transmit mode with optimal channel quality to the transmit end when transmission channel quality corresponding to all transmit modes is traversed but no transmit mode that meets the QoS requirement is found.

In the wireless communications method and system provided in the embodiments of the present invention, a transmit module transmits M narrow beams according to a QoS requirement, and a receive end receives N beams according to the QoS requirement, so as to form an N×M transmission channel. Transmission channel quality in different transmit modes is calculated to learn a transmit mode that meets the QoS requirement. If no transmit mode that meets the QoS requirement is found, a transmit mode with optimal channel quality is fed back to a transmit end. Therefore, communication quality can be improved.

BRIEF DESCRIPTION OF THE DRAWINGS

To describe the technical solutions in the present invention more clearly, the following briefly describes the accompanying drawings required for describing the implementation manners. Apparently, the accompanying drawings in the following description show merely some implementation manners of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
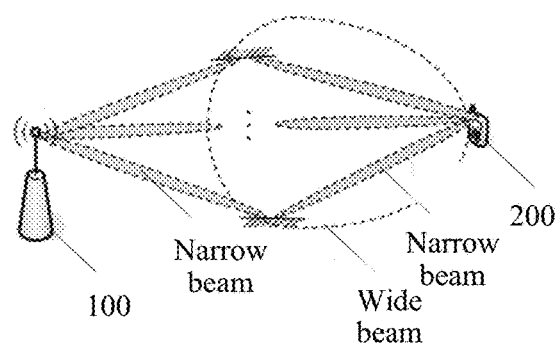
FIG. 1 is a schematic structural diagram of a wireless communications system according to an embodiment of the present invention.
Figure 2:
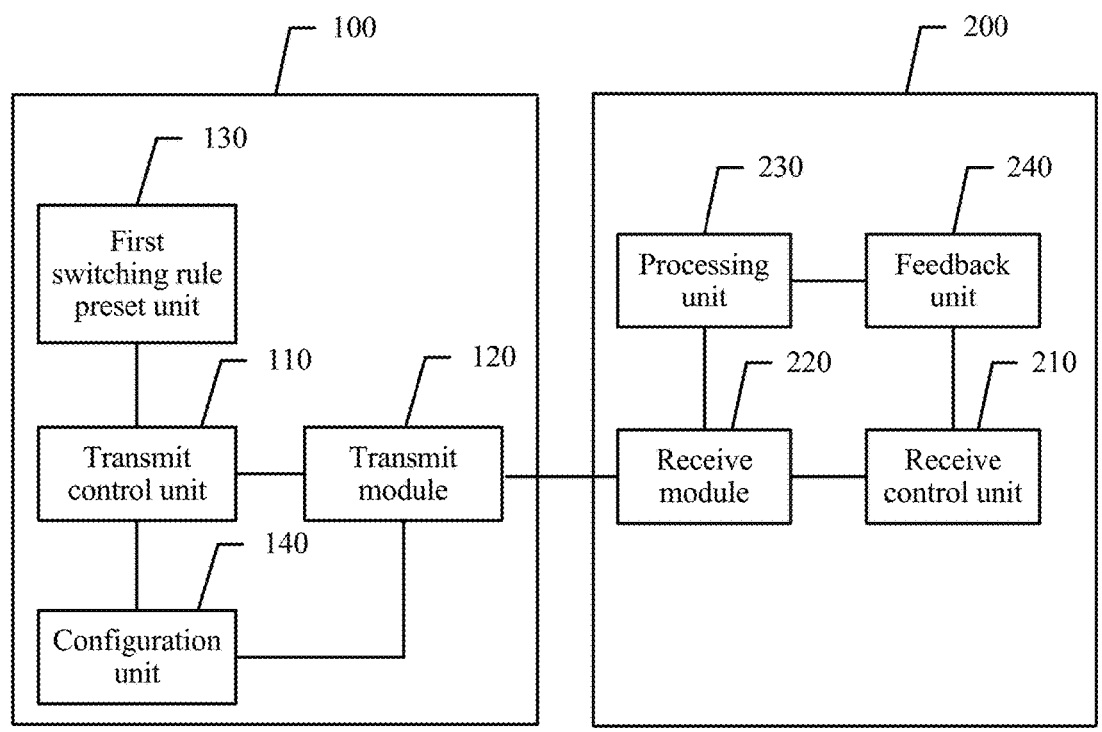
FIG. 2 is a schematic module diagram of a wireless communications system according to a first embodiment of the present invention.

Referring to FIG. 1 and FIG. 2, a first embodiment of the present invention provides a wireless communications system. The wireless communications system includes a transmit end 100 and a receive end 200. Data may be transmitted between the transmit end 100 and the receive end 200 by using a wireless communications method. The transmit end 100 includes a transmit module 120 having at least two antenna units. The transmit module 120 transmits M narrow beams with different spatial directions (beams with relatively narrow coverage) according to a quality of service (QoS) requirement, and switches a transmit mode according to a preset switching rule. A set of the spatial directions of the M narrow beams forms a transmit mode.

Figure 3:
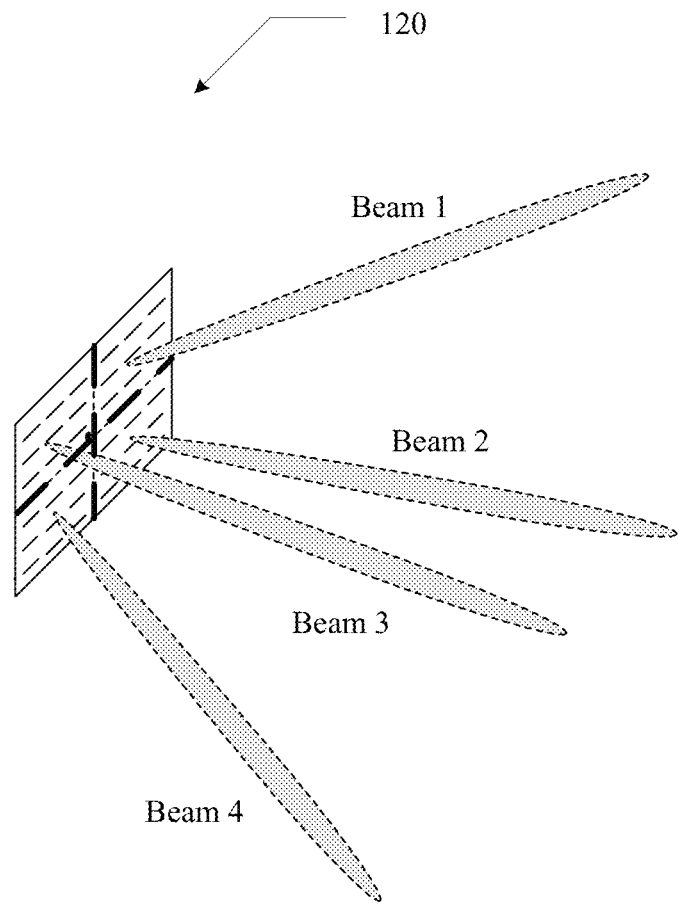
FIG. 3 is a schematic diagram of transmitting a narrow beam by a transmit module.

Referring to FIG. 1 to FIG. 3, in this embodiment of the present invention, the transmit end 100 may be a base station (BS) or user equipment (UE), and has a transmit module 120, and the transmit module 120 includes at least two antenna units. The transmit end 100 includes a transmit control unit 110, and the transmit control unit 110 controls, according to a QoS requirement in a system, the transmit module 120 to transmit M narrow beams with different spatial directions. A set of the spatial directions of the M narrow beams forms a transmit mode. If a spatial direction of a first narrow beam is $\alpha_1$, a spatial direction of a second narrow beam is $\alpha_2$, ..., and a spatial direction of an $M^{th}$ narrow beam is $\alpha_M$, a current transmit mode is denoted as $\{\alpha_1, \alpha_2, \ldots, \alpha_M\}$.

In this embodiment of the present invention, the transmit end 100 further includes a first switching rule preset unit 130, and the first switching rule preset unit 130 presets a switching rule of a transmit mode of the transmit end 100, so that the transmit control unit 110 switches the transmit mode of the transmit end 100 according to the switching rule that is set by the first switching rule preset unit 130. Specifically, after obtaining the switching rule provided by the first switching rule preset unit 130, the transmit control unit 110 sets, according to a transmit mode defined by the switching rule, the spatial directions of the M narrow beams transmitted by the transmit end 100. For example, for a possible switching rule, definitions may be as follows: Entire space is divided into M areas, and the spatial direction of the narrow beam is determined by two parameters: θ and φ, where θ is a horizontal angle of the narrow beam, and φ is a pitch angle of the narrow beam. A space area allocated to a first narrow beam is $[\theta_{1min}, \theta_{1max}]$ and $[\varphi_{1min}, \varphi_{1max}]$, that is, the first narrow beam, that is, a beam 1 scans the space area $[\theta_{1min}, \theta_{1max}]$ and $[\varphi_{1min}, \varphi_{1max}]$. Similarly, a space area allocated to a $k^{th}$ narrow beam, that is, a beam k (2≤k≤M) is $[\theta_{kmin}, \theta_{kmax}]$ and $[\varphi_{kmin}, \varphi_{kmax}]$, and the beam k scans the space area $[\theta_{kmin}, \theta_{kmax}]$ and $[\varphi_{kmin}, \varphi_{kmax}]$, so that the spatial direction of the narrow beam varies in these space areas.

It should be noted that, in another embodiment of the present invention, space may be set to partitions in another manner. For example, three-dimensional rectangular coordinates or another representation method may be used to represent a definition of the spatial direction, or partitioning does not need to be performed. In addition, the switching rule defined by the first switching rule preset unit 130 may have another definition. For example, a transmit mode may be switched according to a preset codebook order. For a mode switched according to a preset codebook order, space may be divided, and beams are switched according to respective codebooks; or space does not need to be divided, and M narrow beams are entirely switched according to a specific rule. Space division and beam switching are simultaneously performed, and the space division is not limited herein. Generally, the first switching rule preset unit 130 switches a switching rule each time a preset period T1 expires, that is, the transmit end 100 switches a transmit mode each time the period T1 expires. For example, an original transmit mode is a first transmit mode, the transmit mode is switched to a second transmit mode after one period T1 and is switched to a third transmit mode after two periods T1, and by analogy, the transmit mode is switched to a $t^{th}$ transmit mode after t−1 periods T1.

In this embodiment of the present invention, the receive end 200 may be a BS or a UE, the receive end 200 has a receive module 220, and the receive module 220 includes at least two antenna units. The receive end 200 includes a receive control unit 210, and the receive control unit 210 instructs, according to the QoS, the receive module 220 to receive N beams, so that a transmission channel is formed between the transmit end 100 and the receive end 200. A known sequence is a sequence that includes information known to both the transmit end 100 and the receive end 200, and different narrow beams load mutually different known sequences. Preferably, the known sequences loaded by different narrow beams are orthogonal to each other, so that the known sequences can be distinguished by using the N beams of the receive end 200.

Figure 4:
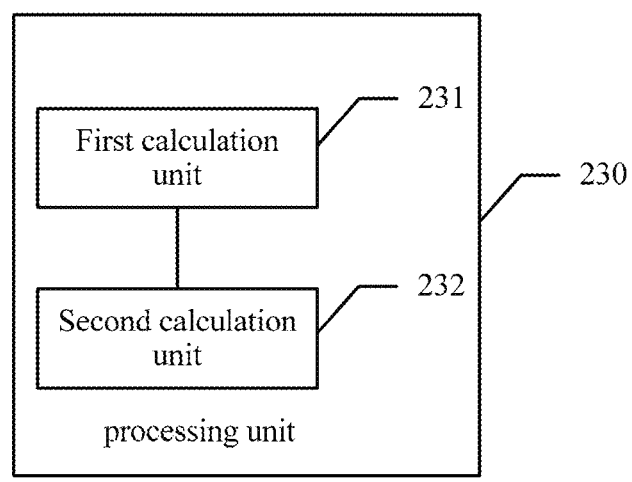
FIG. 4 is a schematic diagram of a module of a processing unit shown in FIG. 2.
Figure 5:
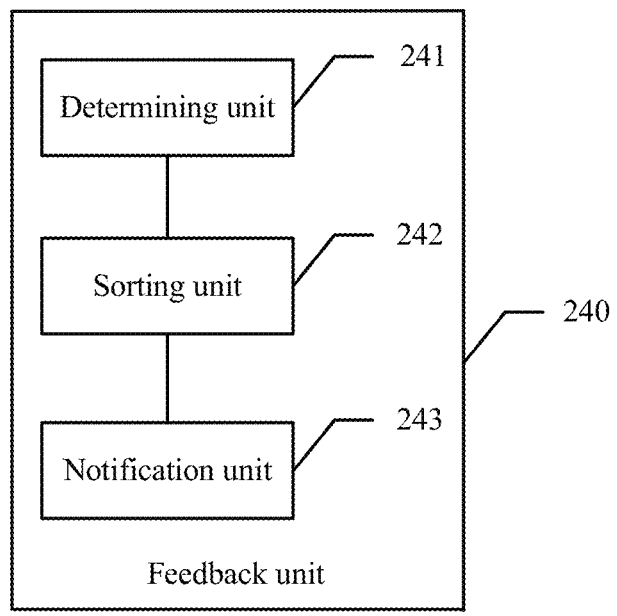
FIG. 5 is a schematic module diagram of a feedback unit shown in FIG. 2.

Referring to FIG. 2 to FIG. 4, in this embodiment of the present invention, the receive end 200 further includes a processing unit 230 that is configured to process signals received by the N wide beams from the transmit end 100. Specifically, the processing unit 230 includes a first calculation unit 231 and a second calculation unit 232. A channel matrix H may be used to represent the transmission channel. The channel matrix H is an N×M matrix. A matrix element $H_{nm}$ (i≤n≤N, i≤m≤M) indicates a channel fading coefficient between an $n^{th}$ wide beam and an $m^{th}$ narrow beam, and the channel fading coefficient may be estimated according to an existing channel estimation algorithm, so that the first calculation unit 231 obtains the channel matrix H through calculation. The second calculation unit 232 calculates a channel capacity of the transmission channel according to the channel matrix H. For example, in a possible implementation manner, the second calculation unit 232 may perform SVD decomposition on the channel matrix H to obtain a channel singular value of the channel matrix H, and the SVD decomposition performed on the channel matrix H is:

$$H = U \begin{bmatrix} \lambda_1 & & & \\ & \lambda_2 & & \\ & & \ddots & \\ & & & \lambda_Q \end{bmatrix} V^H, \quad (1)$$

Q is a smaller value in M and N, and the channel singular value meets a relationship $\lambda_1 \geq \lambda_2 \geq \ldots \geq \lambda_Q \geq 0$; it is assumed that there are r channel singular values greater than 0 in $\lambda_i$ ($1 \leq i \leq Q$), that is, a rank of the channel matrix H is r; after the foregoing SVD decomposition, the transmission channel may be regarded as a composition of r independent parallel subchannels, each subchannel is corresponding to one channel singular value $\lambda_i$ ($1 \leq i \leq r$) of the channel matrix H, and the channel singular value $\lambda_i$ ($1 \leq i \leq r$) is used to represent an amplitude gain of a corresponding subchannel, for example, $\lambda_1$ represents an amplitude gain of a first subchannel, and $\lambda_2$ represents an amplitude gain of a second subchannel; and a greater amplitude gain indicates that the subchannel is more suitable for data transmission. The second calculation unit 232 further calculates the channel capacity of the transmission channel according to the channel singular value by using a Shannon's equation, and a calculation formula is:

$$I = \sum_{i=1}^{r} \log_2(1 + SNR \cdot \lambda_i^2), \quad (2)$$

where

I is the channel capacity of the transmission channel, and SNR is a signal-to-noise ratio that is generated in a signal amplification process of the receive end 200.

It should be noted that, in another embodiment of the present invention, the second calculation unit 232 may calculate the channel capacity by using another algorithm, and a method for calculating the channel capacity is not specifically limited in the present invention.

Referring to FIG. 2 to FIG. 5, in this embodiment of the present invention, the receive end 200 further includes a feedback unit 240. The feedback unit 240 includes a determining unit 241, a sorting unit 242, and a notification unit 243. The determining unit 241 determines whether the channel quality obtained by the second calculation unit 232 through calculation meets the QoS. If a current transmit mode of the transmit end 100 is a $t^{th}$ transmit mode, the receive end 200 obtains $t^{th}$ channel quality through calculation, and compares the $t^{th}$ channel quality with the QoS to determine whether the $t^{th}$ channel quality meets the QoS. When the determining unit 241 determines that the $t^{th}$ channel quality meets the QoS, the notification unit 243 feeds back, to the transmit end 100, feedback information such as the $t^{th}$ transmit mode, information about the $t^{th}$ channel quality, and a corresponding precoding matrix. The precoding matrix may be a codebook sequence number selected from a codebook set according to the channel quality, or may be a matrix that includes first K columns of a V matrix obtained by means of the SVD decomposition and that is used as a precoding matrix of the transmit end, where K is a maximum transmission data stream quantity of the transmission channel. When the determining unit 241 determines that the channel quality of the $t^{th}$ transmit mode does not meet the QoS, the sorting unit 242 sorts the $t^{th}$ transmit mode and previous t−1 transmit modes according to the channel quality. For example, the transmit modes may be sorted in ascending/descending order according to magnitude of the channel quality. Then, if after the transmit end 100 traverses all transmit modes in the first switching rule preset unit 130, the determining unit 241 still finds no transmit mode that meets the QoS, the notification unit 243 sends, to the transmit end 100 according to a sorting result of the sorting unit 242, feedback information such as a transmit mode with optimal channel quality, the corresponding channel quality, and a precoding matrix. Specifically, the notification unit 243 sends the feedback information to the receive control unit 210. The receive control unit 210 forms a wide beam by using a predefined beamforming algorithm, loads the feedback information to the wide beam, and then controls the receive module 220 to transmit the wide beam.

It should be noted that, in another embodiment of the present invention, the feedback information transmitted by the receive end 200 may not include the precoding matrix, and the transmit end 100 may automatically obtain information about the precoding matrix according to the channel quality fed back by the receive end 200. For example, multiple groups of precoding matrices are defined in the Long Term Evolution (Long Term Evolution, LTE) protocol, and the transmit end 100 may select a required precoding matrix from the LTE protocol according to the channel quality.

Figure 6:
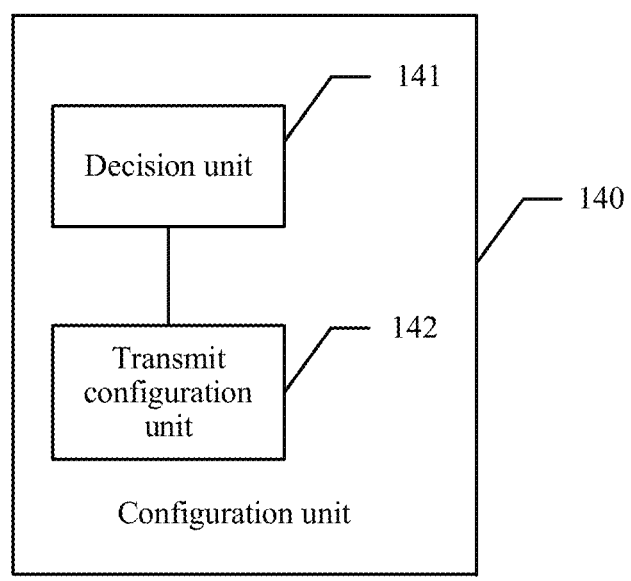
FIG. 6 is a schematic module diagram of a configuration unit shown in FIG. 2.
Figure 7A:
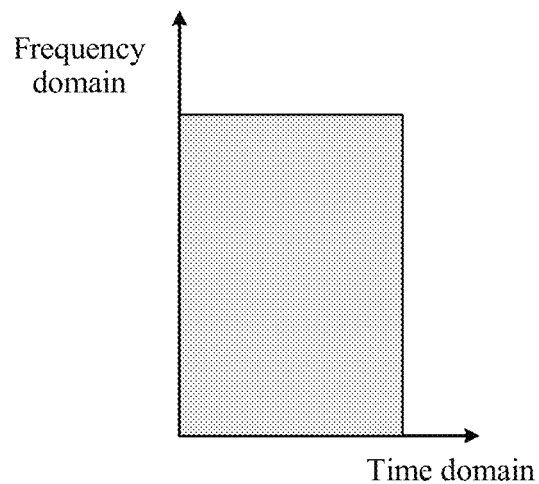
FIG. 7(a) to FIG. 7(c) are schematic diagrams of transmission modes and resource allocation that are in different QoS.

Referring to FIG. 6 and FIG. 7, in this embodiment of the present invention, the transmit end 100 further includes a configuration unit 140. After the feedback information sent by the receive end 200 by using the wide beam is received by using the M narrow beams of the transmit end 100, the transmit control unit 110 sets the transmit mode of the transmit end 100 to the transmit mode fed back by the receive end 200. The configuration unit 140 selects a transmission mode for and allocates a resource to the transmit module 120. Specifically, the configuration unit 140 includes a decision unit 141 and a transmit configuration unit 142. The decision unit 141 sets a decision threshold $\lambda_o$. When the channel singular value $\lambda_i$ ($1 \leq i \leq r$) is greater than or equal to the decision threshold $\lambda_o$, it indicates that a subchannel corresponding to the singular value is suitable for data transmission. On the contrary, it indicates that the subchannel corresponding to the singular value is not suitable for data transmission. The decision unit 141 collects statistics about a quantity of channel singular values greater than or equal to the decision threshold $\lambda_o$ in the channel singular value $\lambda_i$ ($1 \leq i \leq r$). For example, when there are K channel singular values greater than $\lambda_o$ in $\lambda_i$ ($1 \leq i \leq r$), it indicates that the maximum transmission data stream quantity of the transmission channel is K. It may be understood that, in another embodiment of the present invention, when the second calculation unit 232 calculates the channel capacity by using another algorithm, the decision unit 141 performs determining in a manner corresponding to the algorithm, to obtain a quantity of streams suitable for data transmission, and this is not specifically limited in the present invention.

Figure 7B:
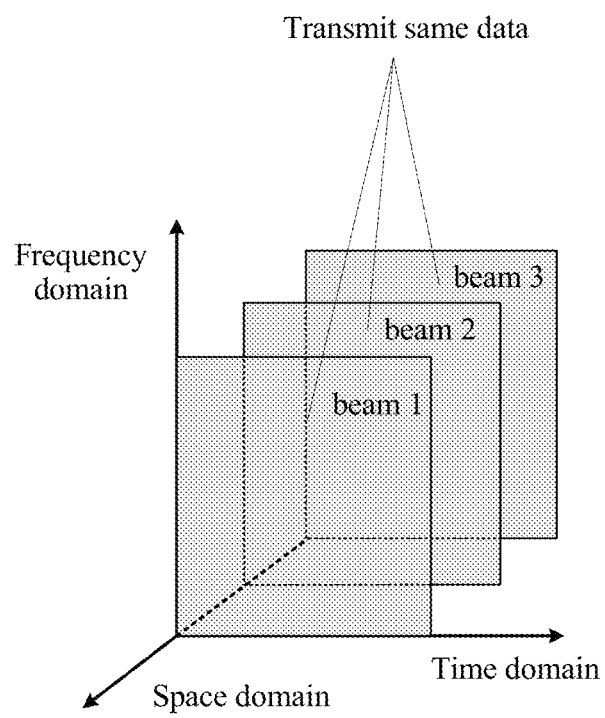
Figure 7C:
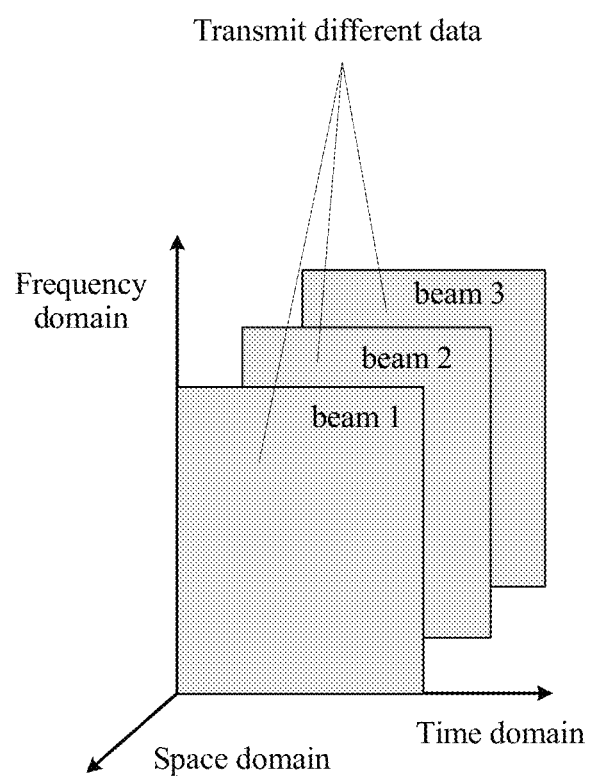

In this embodiment of the present invention, the transmit configuration unit 142 selects a transmission mode and a resource allocation scheme according to the maximum transmission data stream quantity and the QoS. For example, when K=1, that is, only one data stream can be transmitted on the transmission channel, the transmit end 100 may generate one wide beam by using all antenna units to perform communication (in this case, only one narrow beam is output, that is, a single output case), that is, a beamforming working mode shown in FIG. 7(a). When K>1, for a QoS requirement that has a relatively high requirement for communication quality, as shown in FIG. 7(b), K data streams may be used to simultaneously transmit same data, that is, a beam 1, a beam 2, and a beam 3 (a case in which K=3, or K may be another value) transmit same data, and then transmit power is allocated to the beam 1, the beam 2, and the beam 3 by using the precoding matrix, that is, a transmission diversity gain is achieved by using multiple narrow beams. When K>1, for a QoS requirement that has a relatively large requirement for a rate, as shown in FIG. 7(c), when communication quality is ensured, data streams may be used to transmit different data, that is, a beam 1, a beam 2, and a beam 3 transmit different data. Transmit power is allocated to the beam 1, the beam 2, and the beam 3 by using the precoding matrix, that is, a multiplexing gain is achieved by using multiple narrow beams. The transmit configuration unit 142 sends the transmission mode and the resource allocation scheme to the transmit control unit 110. The transmit control unit 110 controls, according to the transmission mode and the resource allocation scheme, the transmit module 120 to send a corresponding narrow beam and allocate power to each narrow beam, so as to perform data transmission with the receive end 200 in the transmission mode by using the resource allocation scheme.

It should be noted that, it may be learned from the foregoing description that the transmission channel used for transmitting the M narrow beams of the transmit end 100 and the N beams of the receive end 200 may be a single-input single-output (M=N=1) case, a multiple-output signal-input (M>1, N=1) case, a single-output multiple-input (M=1, N>1) case, a multiple-input multiple-output (M>1, N>1) case, or the like. A specific channel mode is determined by factors such as the QoS requirement and channel quality actually obtained through calculation. This is not specifically limited in the present invention.

In this embodiment of the present invention, a transmit end 100 transmits M narrow beams according to a QoS requirement, and a receive end 200 receives N wide beams according to the QoS requirement, so as to form a transmission channel. A transmit mode of the transmit end 100 is switched according to a switching rule that is preset by a first switching rule preset unit 130, and a processing unit 230 obtains channel quality of the transmit channel in different transmit modes through calculation, so as to search for a transmit mode that meets the QoS or a transmit mode that has optimal channel quality. A configuration unit 140 chooses, according to feedback information of the receive end 200 and according to an actual need, to perform beamforming, transmission diversity, or transmission multiplexing. In the present invention, a structure similar to a transmission channel is construed, and a group of transmission channels with good channel quality are obtained by means of searching. In comparison with a conventional beamforming system, a diversity gain or a multiplexing gain can further be obtained.

Figure 8:
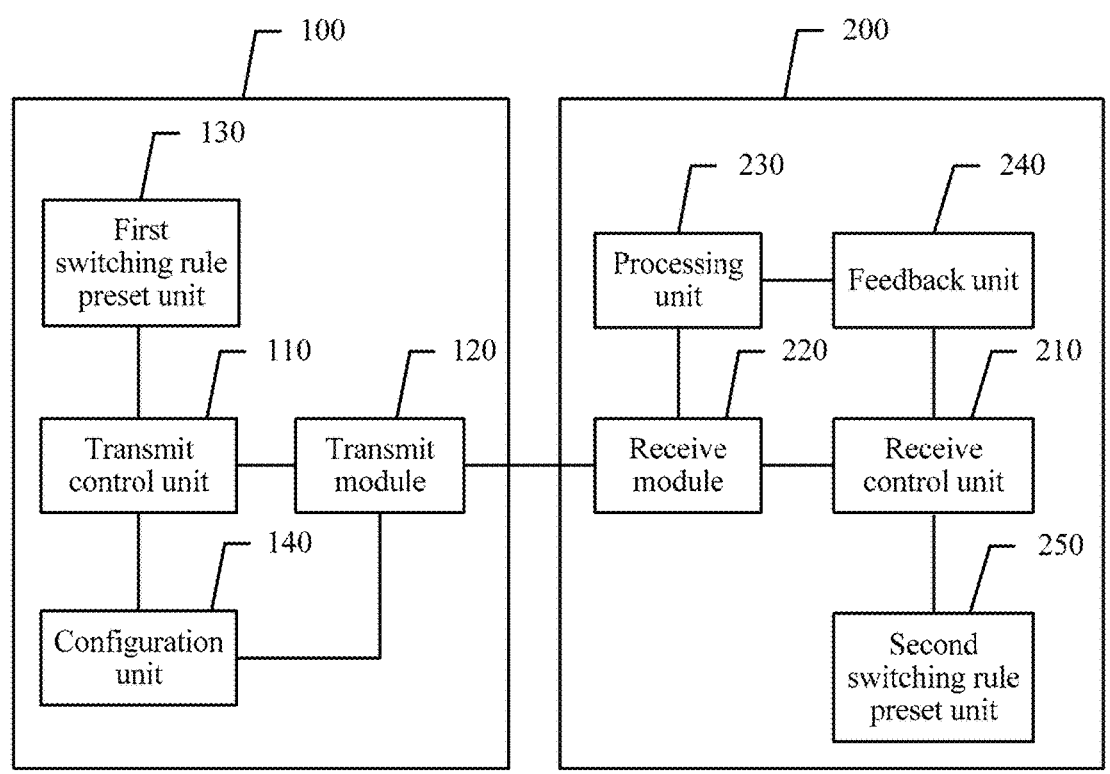
FIG. 8 is a schematic module diagram of a wireless communications system according to a second embodiment of the present invention.

Referring to FIG. 8, FIG. 8 is a module diagram of a wireless communications system according to a second embodiment of the present invention. In this embodiment of the present invention, the wireless communications system includes units and modules in the foregoing first embodiment. A difference is that the receive end 200 receives and detects M narrow beams of the transmit end 100 by using N narrow beams. In this case, a channel gain of the transmission channel is determined by both a transmit mode of the transmit end 100 and a receive mode of the receive end 200, and a set of spatial directions of the N narrow beams of the receive end 200 forms a receive mode.

In this embodiment of the present invention, the receive end 200 further includes a second switching rule preset unit 250, and the second switching rule preset unit 250 sets a switching rule of the receive mode of the receive end 200, to switch the receive mode of the receive end 200. A switching period of the second switching rule preset unit 250 is T2, T2 is a predetermined multiple of T1, and the predetermined multiple is a quantity of transmit modes included in the first switching rule preset unit 130. For example, it is assumed that the switching period of the first switching rule preset unit 130 of the transmit end 100 is T1 and the first switching rule preset unit 130 includes $M_1$ switching rules (that is, $M_1$ transmit modes). In this case, the period T2 of the second switching rule preset unit 250 is $T1 \times M_1$. That is, after the transmit end 100 traverses all transmit modes in the first switching rule preset unit 130 once, the second switching rule preset unit 250 of the receive end 200 switches the receive mode once. It is assumed that the second switching rule preset unit 250 of the receive end 200 includes $N_1$ switching rules (that is, $N_1$ transmit modes). After the receive end 200 traverses all receive modes, $M_1 \times N_1$ transmission channels are generated in total, and correspondingly, there are $M_1 \times N_1$ channel matrices. In this embodiment of the present invention, H11 may be used to represent a channel matrix formed by using a first transmit mode and a first receive mode, and Hij ($1 \leq i \leq M_1$, $1 \leq j \leq N_1$) represents a channel matrix formed by using an $i^{th}$ transmit mode and a $j^{th}$ receive mode.

In this embodiment of the present invention, a first calculation unit 231 of the processing unit 230 calculates each channel matrix Hij, a second calculation unit 232 obtains, through calculation, a channel singular value of each channel matrix Hij according to the channel matrix Hij that is obtained by the first calculation unit 231 through calculation, and then, calculates a channel capacity of each channel matrix Hij. The determining unit 241 of the feedback unit 240 determines whether channel quality of the channel matrix Hij meets the QoS, and if the channel quality of the channel matrix Hij meets the QoS, the notification unit sends, to the receive control unit 210, information such as the channel quality, a transmit mode, and a receive mode that are of the channel matrix meeting the QoS. The receive control unit 210 sets the receive mode of the receive end 200 to the receive mode (that is, a receive mode that meets the QoS) sent by the notification unit 241, and feeds back, in this receive mode, the transmit mode that meets the QoS and channel quality information to the transmit end 100. If the determining unit 241 determines that the channel matrix does not meet the QoS, the sorting unit 242 sorts the channel matrices according to channel capacities of the channel matrices. When the receive end 200 finds, after traversing all receive modes in the second switching rule preset unit 250, no channel matrix that meets the QoS, the notification unit 243 transmits, to the receive control unit 210, feedback information such as a channel matrix with an optimal channel capacity, a corresponding transmit mode, a corresponding receive mode, and corresponding channel quality. The receive control module 210 sets, according to the information of the notification unit 243, the receive mode of the receive end 200 to the receive mode fed back by the notification unit 243, and feeds back, to the transmit end 100 in this receive mode, a transmit mode and channel quality that are of a transmission channel with a maximum channel capacity. After the transmit end 100 receives and jointly detects, by using the M narrow beams, the feedback information transmitted by the receive end 100, the transmit mode of the transmit end 200 is set to the transmit mode fed back by the receive end 200.

In this embodiment of the present invention, data is transmitted between the transmit end 100 and the receive end 200 in a transmit mode and a receive mode that meet the QoS or have a maximum channel capacity. If a channel matrix that is obtained by the sorting unit 242 by means of sorting and that meets the QoS or has the maximum channel capacity is H45, that is, when the transmit mode of the transmit end 100 is a fourth transmit mode and the receive mode of the receive end 200 is a fifth receive mode, the transmission channel has the maximum channel capacity, the transmit mode of the transmit end 100 is set to the fourth transmit mode, the receive mode of the receive end 200 is set to the fifth receive mode, and data is transmitted in this transmit mode and this receive mode, so that the transmission channel can obtain a gain as large as possible, to meet the QoS requirement.

In this embodiment of the present invention, the transmit mode of the transmit end 100 and the receive mode of the receive end 200 are simultaneously switched, so that a transmission channel with a relatively large gain can be obtained, to meet a high QoS requirement in a system.

Figure 9:
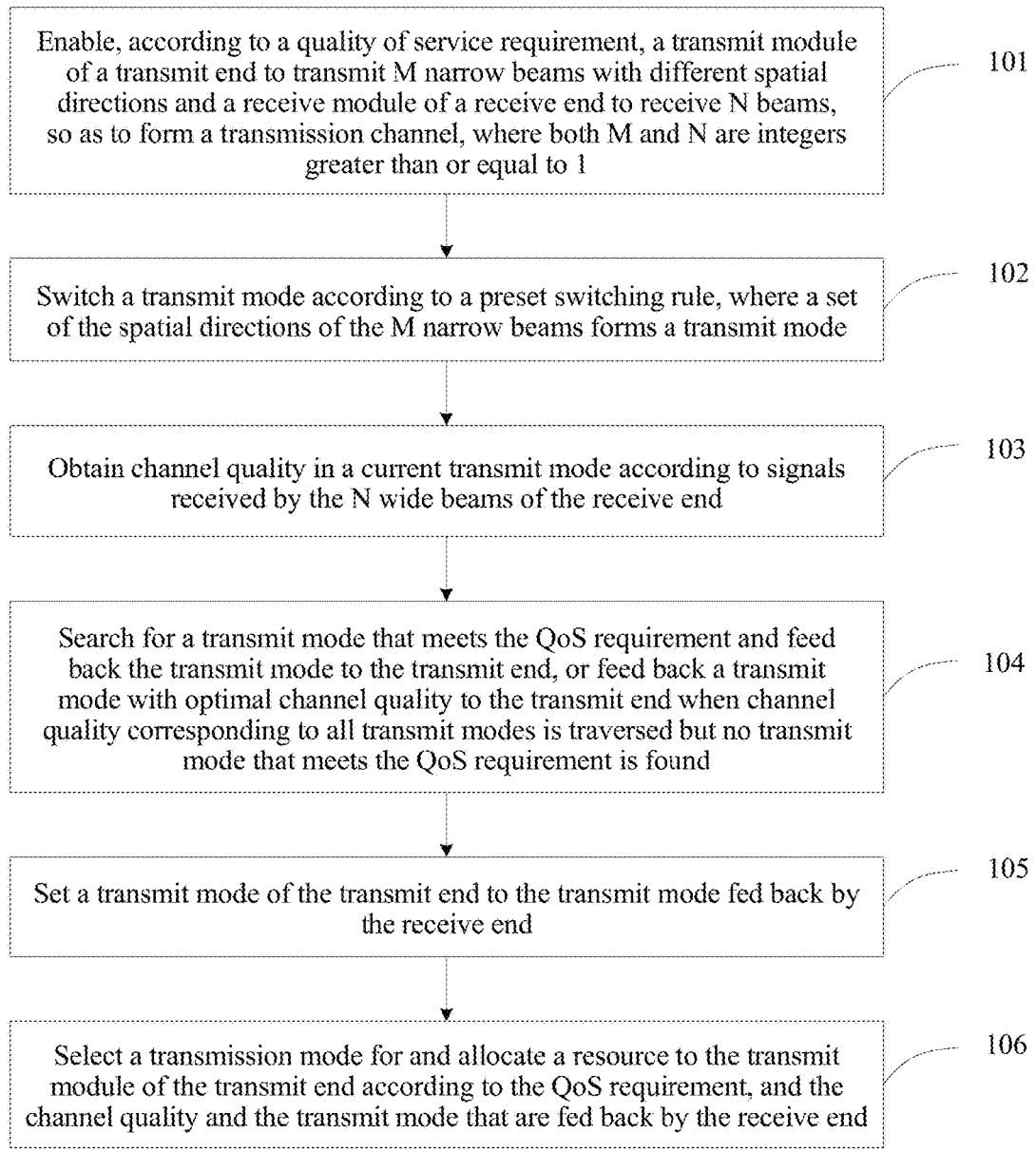
FIG. 9 is a flowchart of a wireless communications method according to a first embodiment of the present invention.

Referring to FIG. 9, FIG. 9 shows a wireless communications method according to a first embodiment of the present invention, and the method includes at least the following steps.

101. Enable, according to a quality of service requirement, a transmit module of a transmit end to transmit M narrow beams with different spatial directions and a receive module of a receive end to receive N beams, so as to form a transmission channel, where both M and N are integers greater than or equal to 1.

In this embodiment of the present invention, a wireless communications system includes a transmit end 100 and a receive end 200. The transmit end 100 may be a base station (BS) or user equipment (UE), and the receive end 200 may also be a BS or UE. The transmit end 100 includes a transmit module, the receive end 200 includes a receive module, the transmit module and the receive module each include at least two antenna units, and the antenna units may be configured to transmit or receive a wide beam or a narrow beam. The transmit module and the receive module may be phased array antennas, the phased array antenna includes a phase shifter, the phase shifter may control a spatial direction of a narrow beam transmitted by the antenna unit and control, by setting a phase-shift value of the phase shifter, the transmit end to transmit narrow beams with different spatial directions.

In this embodiment of the present invention, when the wireless communications system receives the QoS requirement, the transmit module of the transmit end 100 transmits M narrow beams with different spatial directions according to the QoS requirement, and the receive end 200 receives N beams according to the QoS requirement. The transmit module and the receive module each include at least two antenna units, and both M and N are integers greater than 1 or equal to 1.

102. Switch a transmit mode according to a preset switching rule, where a set of the spatial directions of the M narrow beams forms a transmit mode.

In this embodiment of the present invention, the M narrow beams each load a known sequence, and the known sequence is a sequence that includes information known to both the transmit end 100 and the receive end 200. The M narrow beams each load the known sequence, and known sequences loaded by different narrow beams are different from each other. Preferably, the known sequences loaded by different narrow beams are orthogonal to each other, so that the receive end 100 can distinguish the M narrow beams.

In this embodiment of the present invention, the transmit end 100 transmits the M narrow beams (a beam 1 to a beam 4 shown in FIG. 3) with different spatial directions, and spatial directions of different narrow beams are different. A set of the spatial directions of the M narrow beams forms a transmit mode. If a spatial direction of a first narrow beam is $\alpha_1$, a spatial direction of a second narrow beam is $\alpha_2$, . . . , and a spatial direction of an $M^{th}$ narrow beam is $\alpha_M$, a current transmit mode is denoted as $\{\alpha_1, \alpha_2, \ldots, \alpha_M\}$.

In this embodiment of the present invention, switching the transmit mode is changing a spatial direction of the narrow beam, and at least one narrow beam has different spatial directions in any two different transmit modes. A changing rule of the spatial direction of the narrow beam may be provided in the switching rule. For example, for a possible switching rule, definitions may be as follows: Entire space is divided into M areas, and the spatial direction of the narrow beam is determined by two parameters: $\theta$ and $\varphi$, where $\theta$ is a horizontal angle of the narrow beam, and $\varphi$ is a pitch angle of the narrow beam. A space area allocated to a first narrow beam is $[\theta_{1min}, \theta_{1max}]$ and $[\varphi_{1min}, \varphi_{1max}]$, that is, the first narrow beam, that is, a beam 1 scans the space area $[\theta_{1min}, \theta_{1max}]$ and $[\varphi_{1min}, \varphi_{1max}]$. Similarly, a space area allocated to a $k^{th}$ narrow beam, that is, a beam k (2≤k≤M) is $[\theta_{kmin}, \theta_{kmax}]$ and $[\varphi_{kmin}, \varphi_{kmax}]$, and the beam k scans the space area $[\theta_{kmin}, \theta_{kmax}]$ and $[\varphi_{kmin}, \varphi_{kmax}]$, so that the spatial direction of the narrow beam varies in these space areas.

It should be noted that, in another embodiment of the present invention, space may be set to partitions in another manner. For example, three-dimensional rectangular coordinates or another representation method may be used to represent a definition of the spatial direction, or partitioning does not need to be performed. In addition, the switching rule may have another definition. For example, a transmit mode may be switched according to a preset codebook order. For a mode switched according to a preset codebook, space may be divided, and beams are switched according to respective codebooks; or space does not need to be divided, and M narrow beams are entirely switched according to a specific rule. Space division and beam switching are simultaneously performed. The space division is not limited herein. Generally, the transmit end 100 switches a transmit mode each time a preset period T1 expires, and the transmit mode may be marked. For example, an original transmit mode is a first transmit mode, the transmit mode is switched to a second transmit mode after one period T1 and is switched to a third transmit mode after two periods T1, and by analogy, the transmit mode is switched to a $t^{th}$ transmit mode after t−1 periods T1.

103. Obtain channel quality in a current transmit mode according to signals received by the N wide beams of the receive end.

Specifically, the following steps may be included.

First, a channel matrix H in the current transmit mode is calculated according to the signals received by the receive end and the known sequences.

In this embodiment of the present invention, the M narrow beams transmitted by the transmit end 100 are propagated according to spatial directions specified in space, and the receive end 200 receives and jointly detects signals of the M narrow beams by using the N wide beams, so as to form an N×M transmission channel. A channel gain of the transmission channel is determined by both the transmit end 100 and the receive end 200, a gain of the receive end 200 is a fixed gain, and transmission channels with different gains may be obtained by searching for a transmit mode of the transmit end 100.

In this embodiment of the present invention, a channel matrix H may be used to represent the transmission channel, the channel matrix H is an N×M matrix, a matrix element $H_{nm}$ (i≤n≤N, i≤m≤M) in the channel matrix indicates a channel fading coefficient between an $n^{th}$ wide beam and an $m^{th}$ narrow beam, and the channel fading coefficient may be provided according to an existing channel estimation algorithm, so as to obtain the channel matrix H.

Then, SVD decomposition is performed on the channel matrix H to obtain a channel singular value of the channel matrix H, and a channel capacity of the transmission channel is calculated according to the channel singular value.

In this embodiment of the present invention, after generating the channel matrix H, the receive end 200 may calculate channel quality of the transmission channel. The channel quality is evaluated mainly by the channel singular value and the channel capacity. In a possible implementation manner, the channel singular value may be obtained by performing the SVD decomposition on the channel matrix H, and the SVD decomposition performed on the channel matrix H is:

$$H = U \begin{bmatrix} \lambda_1 & & & \\ & \lambda_2 & & \\ & & \ddots & \\ & & & \lambda_Q \end{bmatrix} V^H, \quad (1)$$

where

Q is a smaller value in M and N, and the channel singular value $\lambda_1 \geq \lambda_2 \geq \ldots \geq \lambda_Q \geq 0$; it is assumed that there are r channel singular values greater than 0 in $\lambda_i$ (1≤i≤Q), that is, a rank of the channel matrix H is r; after the foregoing SVD decomposition, the transmission channel may be regarded as a composition of r independent parallel subchannels, each subchannel is corresponding to one channel singular value $\lambda_i$ (1≤i≤r) of the channel matrix H, and the channel singular value $\lambda_i$ (1≤i≤r) is used to represent an amplitude gain of a corresponding subchannel, for example, $\lambda_1$ represents an amplitude gain of a first subchannel, and $\lambda_2$ represents an amplitude gain of a second subchannel; and a greater amplitude gain indicates that the subchannel is more suitable for data transmission. The channel capacity of the transmission channel may be given by using a Shannon's equation:

$$I = \sum_{i=1}^{r} \log_2(1 + SNR \cdot \lambda_i^2), \quad (2)$$

where

SNR is a signal-to-noise ratio that is generated in a signal amplification process of the receive end 200.

It should be noted that, in another embodiment of the present invention, the channel capacity may be calculated by using another algorithm, and this is not specifically limited in the present invention.

104. Search for a transmit mode that meets the QoS requirement and feedback the transmit mode to the transmit end, or feedback a transmit mode with optimal channel quality to the transmit end when transmission channel quality corresponding to all transmit modes is traversed but no transmit mode that meets the QoS requirement is found.

Specifically, the following steps may be included.

First, when channel quality of the transmit mode meets the QoS, the transmit mode that meets the QoS and channel quality information corresponding to the transmit mode are fed back to the transmit end, or otherwise, the transmit modes are sorted according to the channel quality, and searching is performed in a next transmit mode.

In this embodiment of the present invention, the transmit end 100 switches the transmit mode according to a period T1, and similarly, the receive end 200 calculates the channel quality corresponding to the transmit mode according to the period T1. If a current transmit mode of the transmit end 100 is a $t^{th}$ transmit mode, the receive end 200 obtains $t^{th}$ channel quality through calculation. The receive end 200 compares the QoS with the $t^{th}$ channel quality that is generated through calculation and that is corresponding to the $t^{th}$ transmit mode, to determine whether the $t^{th}$ channel quality meets the QoS. The QoS mainly includes a transmission rate requirement and an error rate requirement. When the $t^{th}$ channel quality obtained by the receive end 200 through calculation meets the QoS, the receive end 200 sends, to the transmit end 100 by using a wide beam, feedback information such as the $t^{th}$ transmit mode, information about the $t^{th}$ channel quality, and a corresponding precoding matrix. The precoding matrix information may be a codebook sequence number selected from a codebook set according to the channel quality, or may be a matrix that includes first K columns of a V matrix obtained by means of the SVD decomposition and that is used as a precoding matrix of the transmit end, where K is a maximum transmission data stream quantity of the transmission channel. When the receive end 200 determines that the channel quality of the current transmit mode does not meet the QoS, the receive end 200 sorts the $t^{th}$ transmit mode and previous t−1 transmit modes according to the channel quality. For example, the transmit modes may be sorted in ascending/descending order according to magnitude of the channel capacity.

Then, when no transmit mode that meets the QoS is found after all transmit modes in the switching rule are traversed, a transmit mode with an optimal channel capacity and corresponding channel quality are fed back to the transmit end by using a wide beam.

In this embodiment of the present invention, when the transmit end 100 finds, after traversing all transmit modes in the switching rule, no transmit mode that meets the QoS, the receive end 200 sends, to the transmit end 100 according to a sorting result by using a wide beam, feedback information such as a transmit mode with a maximum channel capacity, channel quality, and a precoding matrix.

It should be noted that, in another embodiment of the present invention, the feedback information may not include the precoding matrix, and the transmit end 100 may automatically select information about the precoding matrix according to the channel quality fed back by the receive end. For example, multiple groups of precoding matrices are defined in the Long Term Evolution (LTE) protocol, and the transmit end 100 may select a required precoding matrix from the LTE protocol according to the channel quality.

105. Set a transmit mode of the transmit end to the transmit mode fed back by the receive end.

In this embodiment of the present invention, the receive end 200 generates a wide beam, and loads the feedback information on the wide beam. The feedback information transmitted by the receive end 200 is received and jointed detected by using the M narrow beams of the transmit end, a modulation and coding scheme (MCS) is selected according to the feedback information to complete a precoding operation, and the transmit mode of the transmit end 100 is set to the transmit mode fed back by the receive end 200. The transmit mode fed back by the receive end 200 may be a transmit mode that meets the QoS, or may be a transmit mode that does not meet the QoS requirement, but this transmit mode is a transmit mode with an optimal channel capacity in all transmit modes.

106. Select a transmission mode for and allocate a resource to the transmit module of the transmit end according to the QoS requirement, and the channel quality and the transmit mode that are fed back by the receive end.

In this embodiment of the present invention, the transmit end 100 may select the transmission mode and allocate the resource according to the QoS requirement of a system and the feedback information of the receive end 200 by using the following steps.

First, a maximum transmission data stream quantity that can be supported by the transmission channel is obtained.

Specifically, in this embodiment of the present invention, after the SVD decomposition is performed on the channel matrix H, r non-zero singular values $\lambda_i$ ($1 \leq i \leq r$) are obtained, and if a value of $\lambda_i$ is relatively small, it indicates that a subchannel corresponding to the singular value $\lambda_i$ has a relatively small amplitude gain, and data may be submerged by noises when the subchannel is used to transmit the data. The transmit end 100 sets a decision threshold $\lambda_o$, and when the channel singular value $\lambda_i$ ($1 \leq i \leq r$) is greater than or equal to the decision threshold $\lambda_o$, it indicates that a subchannel corresponding to the singular value is suitable for data transmission, or on the contrary, the subchannel is not suitable for data transmission. If there are K channel singular values greater than $\lambda_o$ in $\lambda_i$ ($1 \leq i \leq r$), it indicates that the transmission channel can simultaneously transmit a maximum of K data streams.

Then, a transmission mode and a resource allocation scheme are selected according to the maximum transmission data stream quantity and the QoS requirement.

Specifically, in this embodiment of the present invention, the QoS requirement mainly includes a rate requirement and an error rate requirement. When K=1, that is, only one data stream can be transmitted on the transmission channel, the transmit end 100 may generate one narrow beam by using all antenna units to perform communication, that is, a beamforming working mode. As shown in FIG. 7(*a*), a spatial direction of the narrow beam is a spatial direction of the first narrow beam in the transmit mode that is fed back. When K>1, for a QoS requirement that has a relatively high requirement for communication quality, as shown in FIG. 7(*b*), data streams may be used to transmit same data, that is, a beam 1, a beam 2, and a beam 3 transmit same data, and then transmit power is allocated to the beam 1, the beam 2, and the beam 3 by using the precoding matrix, that is, a diversity gain is achieved by using multiple narrow beams. When K>1, for a QoS requirement that has a relatively large requirement for a rate, as shown in FIG. 7(*c*), when communication quality is ensured, data streams may be used to transmit different data, that is, a beam 1, a beam 2, and a beam 3 transmit different data. Transmit power is allocated to the beam 1, the beam 2, and the beam 3 by using the precoding matrix, that is, a multiplexing gain is achieved by using multiple narrow beams.

It should be noted that, it may be learned from the foregoing description that the transmission channel in this embodiment of the present invention may be a single-input single-output (M=N=1) case, a multiple-output signal-input (M>1, N=1) case, a single-output multiple-input (M=1, N>1) case, an MIMO (M>1, N>1) case, or the like. A specific channel mode is determined by factors such as the QoS requirement and channel quality actually obtained through calculation. This is not specifically limited in the present invention.

It may be understood that, in another embodiment of the present invention, when the channel capacity is calculated by using another algorithm, a manner corresponding to the algorithm is used in the present invention to perform determining, to obtain a stream quantity that is suitable for data transmission, and this is not limited in the present invention.

In this embodiment of the present invention, a transmit end 100 transmits M narrow beams according to a QoS requirement, and a receive end 200 receives the M narrow beams according to the QoS requirement by generating N wide beams, so as to form a transmission channel. A transmit mode of the transmit end 100 is switched according to a preset switching rule. The receive end 200 processes the M narrow beams transmitted by the transmit end 100, to obtain channel quality information corresponding to the transmit mode. A transmit mode that meets the QoS is obtained by means of searching and is fed back to the transmit end 100, so that the transmit end 100 sets the transmit mode of the transmit end 100 to the transmit mode fed back by the receive end 200, to choose, according to an actual need, to perform beam forming, transmission diversity, or transmission multiplexing. In the present invention, a structure similar to a transmission channel is construed, and a group of transmission channels with good channel quality are obtained by means of searching. In comparison with a conventional beamforming system, a diversity gain or a multiplexing gain can be obtained.

Figure 10:
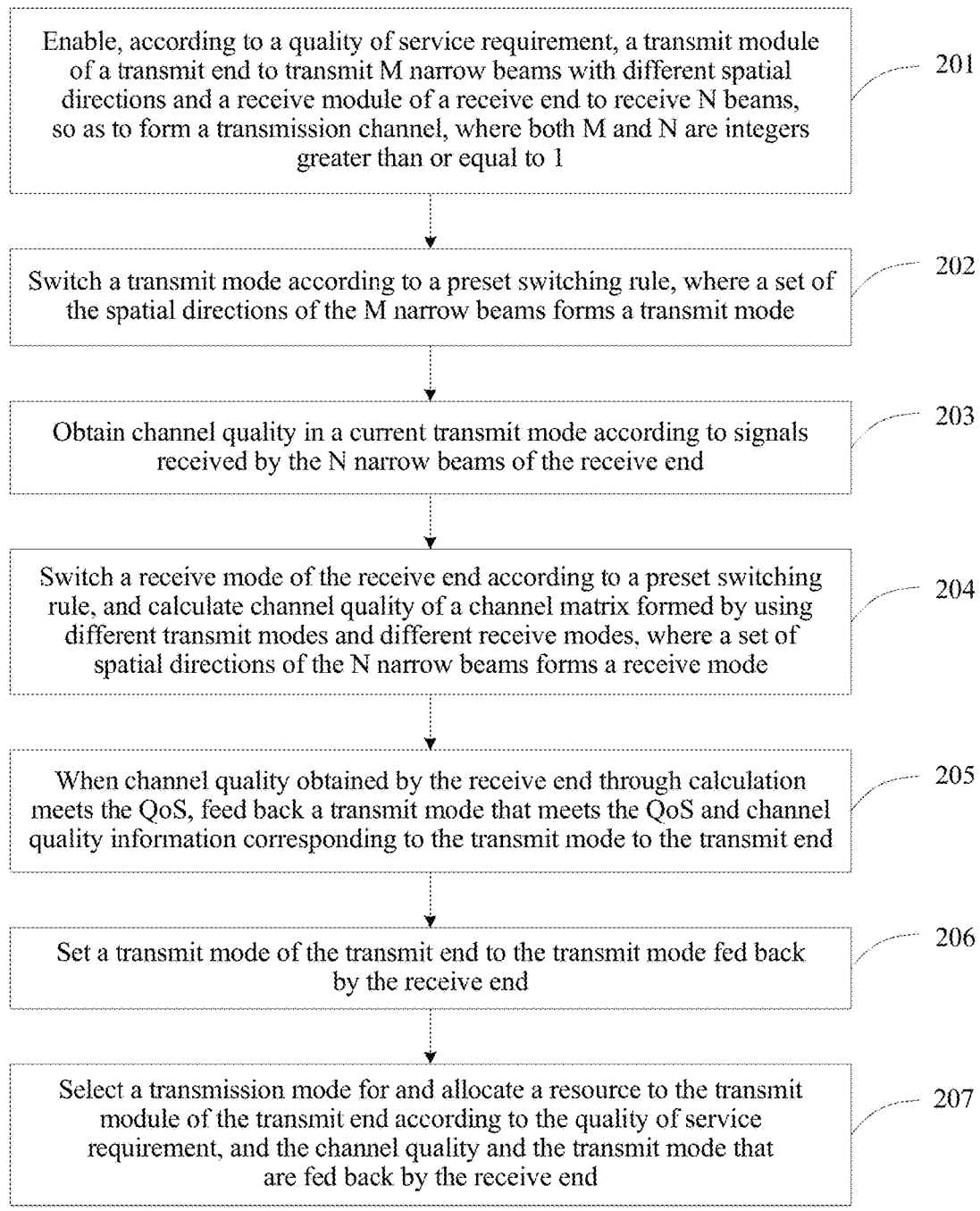
FIG. 10 is a flowchart of a wireless communications method according to a second embodiment of the present invention.

Referring to FIG. 10, FIG. 10 is a wireless communications method according to a second embodiment of the present invention, and the method includes at least the following steps.

201. Enable, according to a quality of service requirement, a transmit module of a transmit end to transmit M narrow beams with different spatial directions and a receive module of a receive end to receive N beams, so as to form a transmission channel, where both M and N are integers greater than or equal to 1.

In this embodiment of the present invention, a transmit end 100 and a receive end 200 each are a BS and may transmit or receive a narrow beam.

202. Switch a transmit mode according to a preset switching rule, where a set of the spatial directions of the M narrow beams forms a transmit mode.

203. Obtain channel quality in a current transmit mode according to signals received by the N narrow beams of the receive end.

In this embodiment of the present invention, the receive end receives the M narrow beams of the transmit end by using the N narrow beams, to form a transmission channel. A channel gain of the transmission channel is determined by both a transmit mode of the transmit end 100 and a receive mode of the receive end 200, and different transmit modes and different receive modes form transmission channels with mutually different channel gains. A set of spatial directions of the N narrow beams form a receive mode.

204. Switch a receive mode of the receive end according to a preset switching rule, and calculate channel quality of channel matrices formed by using different transmit modes and different receive modes, where a set of spatial directions of the N narrow beams forms a receive mode.

In this embodiment of the present invention, because the channel gain of the transmission channel is determined by both the transmit mode of the transmit end and the receive mode of the receive end, the transmit mode of the transmit end and the receive mode of the receive end need to be simultaneously switched, so as to search for a transmission channel that meets a QoS or that has relatively high channel quality. Specifically, the receive end 200 presets a switching rule, and switches the receive mode of the receive end 200 according to the switching rule. A switching period of the receive mode of the receive end 200 is T2, and T2 is a preset multiple of a period T1. The preset multiple is a quantity of switching rules. If the transmit end 100 has $M_1$ switching rules (each rule is corresponding to one transmit mode), $T2=T1 \times M_1$, the transmit mode of the transmit end 100 and the receive mode of the receive end 200 are simultaneously switched, and the receive end 200 switches the receive mode once after the transmit end 100 traverses transmit modes once. It is assumed that the receive end 200 has $N_1$ switching rules (that is, $N_1$ transmit modes). After the receive end 200 traverses all receive modes, $M_1 \times N_1$ transmission channels are generated in total, and correspondingly, there are $M_1 \times N_1$ channel matrices. In this embodiment of the present invention, H11 may be used to represent a channel matrix formed by using a first transmit mode and a first receive mode, and Hij ($\leq i \leq M_1$, $1 \leq j \leq N_1$) represents a channel matrix formed by using an $i^{th}$ transmit mode and a $j^{th}$ receive mode.

205. When channel quality obtained by the receive end through calculation meets the QoS, feedback a transmit mode that meets the QoS and channel quality information corresponding to the transmit mode to the transmit end.

First, when the channel quality of the channel matrix meets the QoS, a receive mode that meets the QoS is set to the receive mode of the receive end, and the transmit mode that meets the QoS and the channel quality are fed back to the transmit end in this receive mode, or otherwise, the channel matrices are sorted according to the channel quality.

In this embodiment of the present invention, the receive end 200 calculates channel quality of each channel matrix Hij, compares the channel quality with the QoS to determine whether the channel quality meets the QoS, and if the channel quality meets the QoS, generates the channel quality that meets the QoS, corresponding transmit mode information, and corresponding receive mode information. After the receive mode of the receive end 200 is set to the receive mode that meets the QoS, the channel quality that meets the QoS and the corresponding transmit mode are fed back to the transmit end 100 in this receive mode. If the channel quality does not meet the QoS, the channel matrix and a previously obtained channel matrix are sorted. For example, sorting is performed according to a channel capacity.

Then, when no channel matrix that meets the QoS is found after all receive modes in the switching rule are traversed, the receive mode of the receive end is set, according to a sorting result, to a receive mode with a maximum channel capacity, and a transmit mode with a maximum channel capacity and channel quality are fed back to the transmit end in this receive mode.

In this embodiment of the present invention, when the receive end 200 finds, after traversing all switching rules, that is, after traversing all receive modes, no channel matrix that meets the QoS, the receive end 200 obtains, according to a sorting result, a receive mode and a transmit mode that are corresponding to the channel matrix with highest channel quality, and after the receive mode of the receive end 200 is set to the receive mode of the channel matrix with the highest channel quality, the channel quality of the channel matrix with the highest channel quality and a corresponding transmit mode are fed back to the transmit end 100 in the receive mode.

It should be noted that, in this embodiment of the present invention, the switching rule of the transmit mode of the receive end 200 may be the same as or different from the switching rule of the transmit mode of the transmit end 100. This is not limited in the present invention.

206. Set a transmit mode of the transmit end to the transmit mode fed back by the receive end.

In this embodiment of the present invention, feedback information (spatial directions of the N narrow beams are defined by the receive mode that is obtained in step 205 and that meets the QoS or a receive mode with a maximum channel capacity) on the N narrow beams of the receive end 200 is received and jointly detected by using the M narrow beams of the transmit end 100, a modulation and coding scheme (MCS) is selected according to the feedback information to complete a precoding operation, and the transmit mode of the transmit end 100 is set to the transmit mode fed back by the receive end 200.

207. Select a transmission mode for and allocate a resource to the transmit module of the transmit end according to the quality of service requirement, and the channel quality and the transmit mode that are fed back by the receive end.

In this embodiment of the present invention, the transmit mode of the transmit end 100 and the receive mode of the receive end 200 are simultaneously switched, so that a transmission channel with a relatively large gain can be obtained, to meet a high QoS requirement in a system.

The foregoing descriptions are examples of implementation manners of the present invention. It should be noted that a person of ordinary skill in the art may make certain improvements and polishing without departing from the principle of the present invention and the improvements and polishing shall fall within the protection scope of the present invention.

What is claimed is:

1. A wireless communications system comprising:
   a transmit end, wherein the transmit end comprises a transmitter having at least two antennas, the transmitter configured to transmit M narrow beams with different spatial directions according to a quality of service (QoS) requirement, and to switch a transmit mode according to a preset switching rule, wherein a set of the spatial directions of the M narrow beams forms the transmit mode;
   a receive end, wherein the receive end comprises a receiver having at least two antennas, the receiver configured to receive N beams according to the QoS requirement; and
   a transmission channel for transmitting the M narrow beams and the N beams between the receive end and the transmit end,
   wherein the receive end calculates a channel quality of the transmission channel in different transmit modes, searches for a transmit mode that meets the QoS requirement, and feeds back the transmit mode to the transmit end, or feeds back a transmit mode with optimal channel quality to the transmit end if the channel quality corresponding to all transmit modes is traversed and no transmit mode that meets the QoS requirement is found; and
   wherein both the M narrow beams and the N beams are integers greater than or equal to 1, and wherein searching for the transmit mode that meets the QoS requirement and feeding back the transmit mode to the transmit end, or feeding back the transmit mode with optimal channel quality to the transmit end when transmission channel quality corresponding to all transmit modes is traversed but no transmit mode that meets the QoS requirement is found comprises:

when a channel quality of the transmit mode meets the QoS requirement, feeding back to the transmit end, the transmit mode that meets the QoS requirement and channel quality information corresponding to the transmit mode, or otherwise, sorting the transmit modes according to the channel quality and entering a next transmit mode for searching; and when no transmit mode that meets the QoS requirement is found after all transmit modes in the preset switching rule are traversed, feeding back a transmit mode that is obtained by sorting and that has an optimal channel capacity, and corresponding channel quality to the transmit end by using a wide beam.

2. The system according to claim 1, wherein the transmit end comprises a processor configured to control the spatial directions of the M narrow beams transmitted by the transmit end, and wherein the receive end comprises a processor for controlling a reception of the N beams.

3. The system according to claim 2, wherein the processor in the transmit end is further configured to set a switching rule, the switching rule comprising a first preset switching period, wherein the processor switches the transmit mode according to the preset switching period, and wherein the processor controls, according to the transmit mode, the transmitter to send the M narrow beams with different spatial directions.

4. The system according to claim 3, wherein the processor in the receive end is further configured to calculate the channel quality of the transmission channel according to known sequences transmitted on the M narrow beams and received on the N beams, and wherein the known sequences loaded by the M narrow beams are orthogonal to each other.

5. The system according to claim 4, wherein the processor in the receive end is further configured to perform the following operations:

calculating each matrix element in a channel matrix corresponding to the transmission channel according to the known sequences transmitted on the M narrow beams and received on the N beams, performing singular value decomposition (SVD) on the channel matrix to obtain a channel singular value of the channel matrix, and calculating a channel capacity of the transmission channel according to the channel singular value, and wherein the channel quality comprises the channel singular value and the channel capacity.

6. The system according to claim 5, wherein the processor in the receive end is further configured to perform the following operations determining whether the channel quality meets the QoS requirement, and if the channel quality meets the QoS requirement, feeding back to the transmit end, the transmit mode that meets the QoS requirement and transmission channel quality corresponding to the transmit mode, or if the channel quality does not meet the QoS requirement, sorting a current transmit mode and a previous transmit mode according to the channel capacity, and after all transmit modes are traversed, and if no transmit mode that meets the QoS requirement is found, feeding back to the transmit end, a transmit mode that has an optimal channel capacity and transmission channel quality corresponding to the transmit mode.

7. The system according to claim 6, wherein the processor in the receive end is further configured to perform the following operations:

switching a receive mode of the receive end according to a second preset switching period, the second preset switching period being a predetermined multiple of the first preset switching period, and wherein the predetermined multiple is a quantity of transmit modes comprised in a first switching period, and a set of spatial directions of the N narrow beams forming a receive mode.

8. The system according to claim 7, wherein different transmit modes of the transmit end and different receive modes of the receive end form different transmission channels, wherein the processor in the receive end is further configured to search for a transmission channel that meets the QoS requirement, determine whether the channel quality of the transmission channel meets the QoS requirement and if the channel quality meets the QoS requirement, set the receive mode of the receive end to a receive mode which is corresponding to the transmission channel meeting the QoS requirement, feed back, in this receive mode, a transmit mode and a channel quality in the transmit mode to the transmit end, wherein the transmit mode and the channel quality are corresponding to the transmission channel meeting the QoS requirement; or if the channel quality does not meet the QoS requirement, sort the transmission channels according to channel quality; and when find, after all receive modes in the second switching period are traversed, no transmission channel that meets the QoS requirement, set the receive mode of the receive end to a receive mode which is a transmission channel with an optimal channel capacity feed back, in this receive mode, a transmit mode and a channel quality to the transmit end, wherein the transmit mode and the channel quality are of a transmission channel with an optimal channel capacity.

9. The system according to claim 5, wherein the processor in the transmit end is further configured to set a decision threshold and collect statistics about a quantity of channel singular values that are fed back by the receive end and are greater than the decision threshold to obtain a maximum transmission data stream quantity of the transmission channel, and conjure a transmission mode and a resource allocation scheme for the transmitter according to the maximum transmission data stream quantity and the QoS requirement.

10. A wireless communications method comprising:

enabling, according to a quality of service (QoS) requirement, a transmit module of a transmit end to transmit M narrow beams with different spatial directions and a receive module of a receive end to receive N beams, so as to form a transmission channel, wherein both the M narrow beams and the N beams are integers greater than or equal to 1;

switching a transmit mode according to a preset switching rule, wherein a set of the spatial directions of the M narrow beams forms the transmit mode;

obtaining a channel quality in a current transmit mode according to signals received by the N beams of the receive end; and searching for a transmit mode that meets the QoS requirement and feeding back the transmit mode to the transmit end, or feeding back a transmit mode with optimal channel quality to the transmit end when a transmission channel quality corresponding to all transmit modes is traversed and no transmit mode that meets the QoS requirement is found, wherein searching for the transmit mode that meets the QoS requirement and feeding back the transmit mode to the transmit end, or feeding back the transmit mode with optimal channel quality to the transmit end when transmission channel quality corresponding to all transmit modes is traversed but no transmit mode that meets the QoS requirement is found comprises:

when a channel quality of the transmit mode meets the QoS requirement, feeding back to the transmit end, the transmit mode that meets the QoS requirement and channel quality information corresponding to the transmit mode, or otherwise, sorting the transmit modes according to the channel quality and entering a next transmit mode for searching; and when no transmit mode that meets the QoS requirement is found after all transmit modes in the preset switching rule are traversed, feeding back a transmit mode that is obtained by sorting and that has an optimal channel capacity, and corresponding channel quality to the transmit end by using a wide beam.

11. The method according to claim 10, wherein the switching a transmit mode according to a preset switching rule comprises obtaining the channel quality in the current transmit mode according to known sequences on the M narrow beams and received on the N beams of the receive end.

12. The method according to claim 11, wherein obtaining the channel quality in the current transmit mode according to the known sequences on the M narrow beams and received on the N beams of the receive end comprises:

calculating a channel matrix H in the current transmit mode according to the received N beams of the receive end and the known sequences;

performing singular value decomposition (SVD) on the channel matrix H to obtain a channel singular value of the channel matrix H; and calculating a channel capacity of the transmission channel according to the channel singular value, wherein the channel quality comprises the channel singular value and the channel capacity.

13. The method according to claim 10, wherein obtaining channel quality in a current transmit mode according to the received N beams of the receive end further comprises obtaining the channel quality in the current transmit mode according to known sequences on the M narrow beams and received on the N narrow beams of the receive end.

14. The method according to claim 13, further comprising:

after obtaining the channel quality in the current transmit mode according to the known sequences on the M narrow beams and s received on the N beams of the receive end, switching a receive mode of the receive end according to a preset switching rule, and calculating a channel quality of channel matrices formed by different transmit modes and different receive modes, wherein a set of spatial directions of the N beams forms a receive mode; and searching for a transmit mode that meets the QoS requirement and feeding back the transmit mode to the transmit end.

15. The method according to claim 13, wherein the method comprises feeding back the transmit mode with optimal channel quality to the transmit end when transmission channel quality corresponding to all transmit modes is traversed but no transmit mode that meets the QoS requirement is found, the method comprising:

when channel quality of a channel matrix meets the QoS requirement, setting a receive mode that meets the QoS requirement to the receive mode of the receive end, and feeding back, in this receive mode, a transmit mode and the channel quality that meet the QoS requirement to the transmit end, or otherwise, sorting the channel matrices according to the channel quality; and when no transmission channel that meets the QoS requirement is found after all receive modes in the preset switching rule are traversed, obtaining, according to a sorting result, a combination of a receive mode and a transmit mode with highest channel quality, setting the receive mode of the receive end to the receive mode with a maximum channel capacity, and feeding back, in this receive mode, a transmit mode that has optimal channel quality and the channel quality to the transmit end.

16. The method according to claim 10, further comprising, when the channel quality obtained by the receive end through calculation meets the quality of service, after feeding back the channel quality and a transmit mode that meet the quality of service to the transmit end, setting the transmit mode of the transmit end to the transmit mode fed back by the receive end.

17. The method according to claim 16, further comprising, after setting the transmit mode of the transmit end to the transmit mode fed back by the receive end, selecting a transmission mode for and allocating a resource to the transmit module of the transmit end according to the quality of service requirement, and the channel quality and the transmit mode that are fed back by the receive end.

18. The method according to claim 17, wherein selecting the transmission mode for and allocating a resource to the transmit module of the transmit end according to the QoS requirement, and the channel quality and the transmit mode that are fed back by the receive end comprises:

obtaining a maximum transmission data stream quantity that can be supported by the transmission channel; and selecting a transmission mode and a resource allocation scheme according to the maximum transmission data stream quantity and the QoS requirement.

* * * * *